(12) United States Patent  
Snider

(10) Patent No.: US 6,820,341 B2
(45) Date of Patent: Nov. 23, 2004

(54) HACKSAW HAVING IMPROVED BLADE STORAGE

(75) Inventor: Gregory Scott Snider, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/125,163

(22) Filed: Apr. 18, 2002

(65) Prior Publication Data

US 2003/0196339 A1 Oct. 23, 2003

(51) Int. Cl.$^7$ ............................................... B27B 21/02
(52) U.S. Cl. .............................. 30/513; 30/125; 30/517
(58) Field of Search .................... 30/514, 517, 125, 30/513, 506, 507; D8/95, 96, 97; 7/149

(56) References Cited

U.S. PATENT DOCUMENTS

| | | | |
|---|---|---|---|
| 1,180,925 A | | 1/1916 | Welch |
| 1,307,018 A | * | 6/1919 | Nomeland ..................... 7/142 |
| 1,713,972 A | | 5/1929 | Lufkin |
| 2,332,545 A | * | 10/1943 | Acomb ........................ 30/513 |
| 2,399,869 A | | 5/1946 | Hough |
| 2,658,541 A | * | 11/1953 | Heuneman ................... 30/507 |
| 3,038,177 A | * | 6/1962 | Machtle ......................... 7/144 |
| 3,245,445 A | * | 4/1966 | Herman et al. ............... 30/501 |
| 3,327,748 A | | 6/1967 | Reuterfors |
| 3,602,278 A | | 8/1971 | Brucken |
| 3,727,655 A | | 4/1973 | Garcher |
| 3,822,731 A | | 7/1974 | Keymer |
| 3,848,649 A | | 11/1974 | Wanless |
| D245,754 S | | 9/1977 | Breger |
| 4,367,779 A | | 1/1983 | Ewig |
| 4,466,471 A | | 8/1984 | Thomson |
| 4,592,145 A | | 6/1986 | Egan et al. |
| D318,006 S | | 7/1991 | Wanner et al. |
| 5,074,002 A | | 12/1991 | Huang |
| 5,388,333 A | * | 2/1995 | Chen ........................... 30/508 |
| 5,471,752 A | * | 12/1995 | Koetsch ........................ 30/513 |
| D370,610 S | | 6/1996 | Neyton |
| 5,673,488 A | | 10/1997 | Grayo |
| 5,768,788 A | | 6/1998 | Arnold |
| 5,826,344 A | | 10/1998 | Phelon et al. |
| D409,892 S | | 5/1999 | Juhlin |
| 5,911,481 A | * | 6/1999 | Yost ............................ 30/125 |
| 6,070,330 A | | 6/2000 | Phelon et al. |
| 6,079,109 A | | 6/2000 | Ranieri |
| 6,134,791 A | | 10/2000 | Huang |
| 6,240,642 B1 | * | 6/2001 | Templeton ................... 30/125 |
| 6,266,887 B1 | | 7/2001 | Owens et al. |

FOREIGN PATENT DOCUMENTS

FR    2 293 277    12/1974

* cited by examiner

Primary Examiner—Boyer D. Ashley
(74) Attorney, Agent, or Firm—Harness, Dickey & Pierce, P.L.C.

(57) ABSTRACT

A hacksaw in which one or more perishable hacksaw blades are conveniently stored and accessed. The hacksaw includes a beam, which defines a blade storage cavity, a handle and a fastening member that is employed to fixedly fasten the beam to the handle. The fastening member is positioned relative to the beam such that it does not interfere with the movement of the hacksaw blade(s) in the blade storage cavity. A plug, which frictionally engages at least one of the fastening member, the beam and the handle, is employed to seal off an end of the blade storage cavity.

19 Claims, 5 Drawing Sheets

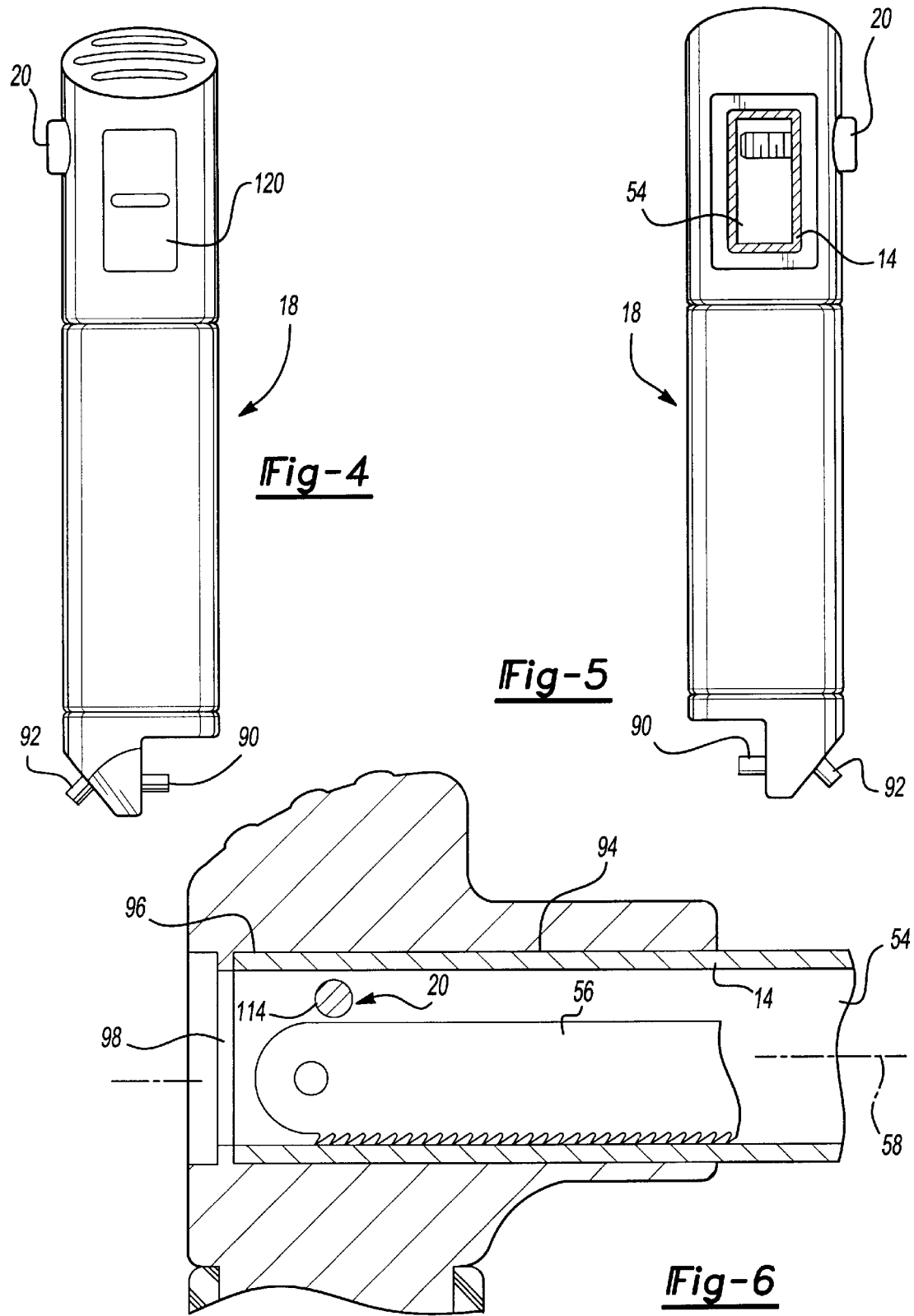

HACKSAW HAVING IMPROVED BLADE STORAGE

FIELD OF THE INVENTION

The present invention generally relates to hacksaws and more particularly to a hacksaw in which one or more perishable hacksaw blades are conveniently stored and accessed.

BACKGROUND OF THE INVENTION

Hacksaws having a tubular beam that is disposed between front and rear handles are well known in the art, as is the use of the hollow cavity in the tubular beam for storing one or more perishable hacksaw blades. A threaded fastener was typically employed to couple the tubular beam to the front handle; the threaded fastener was generally slipped through a hole in one side of the front handle and threadably engaged to a hole in either the opposite side of the front handle or the tubular beam. The fastener was located in the center of the tubular beam and would extend through the tubular beam. The threaded engagement of the fastener into the handle or the tubular beam would therefore not permit the hacksaw blades within the hollow cavity to move forwardly out from the front handle. Accordingly, if an operator desired to withdraw a hacksaw blade from the hollow cavity, it was necessary to first loosen and back off the fastener.

While subsequent generations of hacksaws have incorporated a friction-fitting cap to cover the aperture in the front handle to thereby guard against the infiltration of chips, dust and moisture into the hollow cavity of the tubular beam, there remains a need in the art for a hacksaw in which one or more perishable hacksaw blades are more conveniently stored and accessed.

SUMMARY OF THE INVENTION

In one preferred form, the present invention provides a hacksaw having a handle, a beam and a plug. The beam is coupled at an end to the handle at a connection and defines a blade storage cavity that is configured to receive a perishable hacksaw blade. The plug is selectively coupled to at least one of the handle and the beam to inhibit the hacksaw blade from fully withdrawing from the blade storage cavity. Ingress of the hacksaw blade to and egress of the hacksaw blade from the blade storage cavity are obtained without altering the connection between handle and the beam through the removal of the plug.

In another preferred form, the present invention provides a hacksaw having a handle, a beam, a fastening member and a plug. The beam is coupled to the handle and defines a blade storage cavity that is configured to receive a perishable hacksaw blade. The fastening member has a body and fixes the handle and the beam to one another such that the body is positioned relative to the beam in a manner that permits the hacksaw blade to move into and out of the blade storage cavity while the fastening member secures the handle to the beam. The plug is employed to selectively close off at least a portion of the blade storage cavity to inhibit the hacksaw blade from exiting the blade storage cavity. The plug includes at least one resilient finger that is configured to engage the body of the fastening member when the plug closes off the blade storage cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 4 is a front view of the front handle;

FIG. 5 is a rear view of the front handle;

FIG. 6 is partial longitudinal section view of the hacksaw of FIG. 1 illustrating the relation of the stored hacksaw blades relative to the fastening member;

DETAILED DESCRIPTION OF THE PREFERRED EMBODIMENTS

Figure 1:
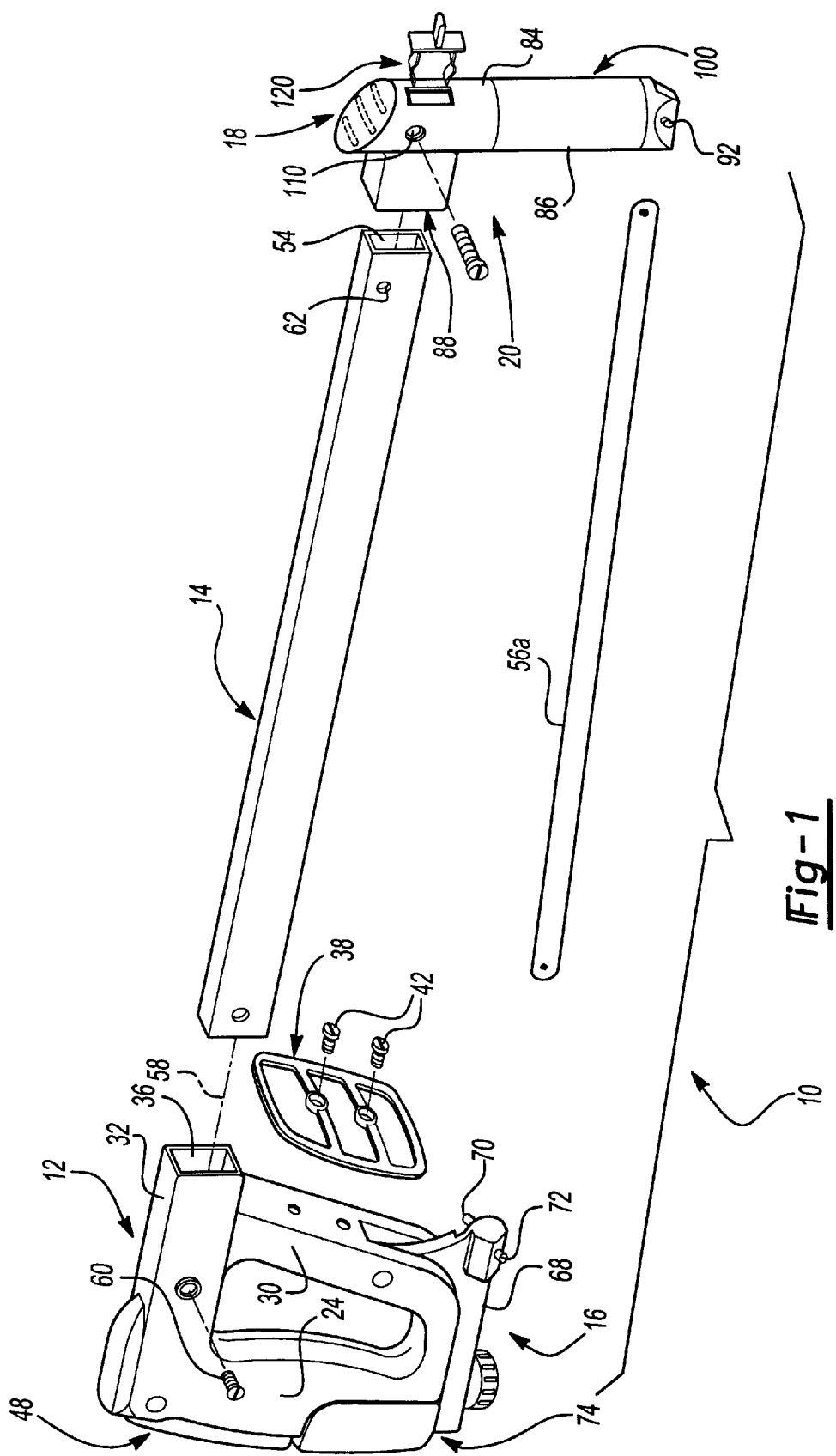
FIG. 1 is an exploded perspective view of a hacksaw constructed in accordance with the teachings of the present invention.

With reference to FIG. 1 of the drawings, a hacksaw constructed in accordance with the teachings of the present invention is generally indicated by reference numeral 10. The hacksaw 10 includes a rear handle 12, a beam 14, a tensioning mechanism 16, a front handle 18 and a fastening member 20.

Figure 2:
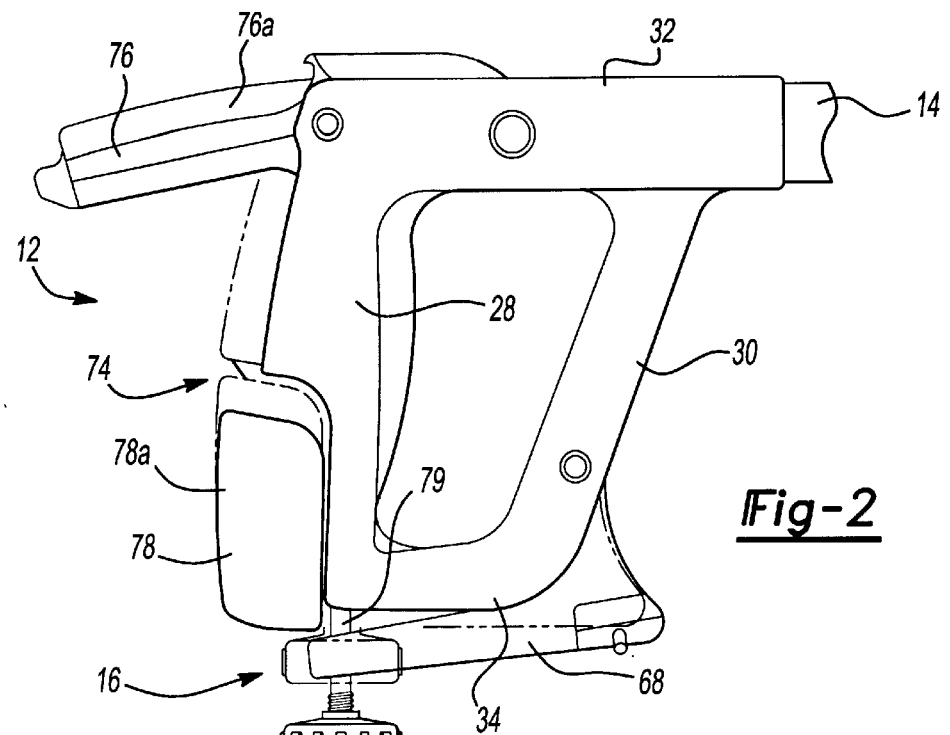
FIG. 2 is an enlarged partially broken out view of a portion of the hacksaw of FIG. 1 illustrating the construction of the rear handle in greater detail.
Figure 3:
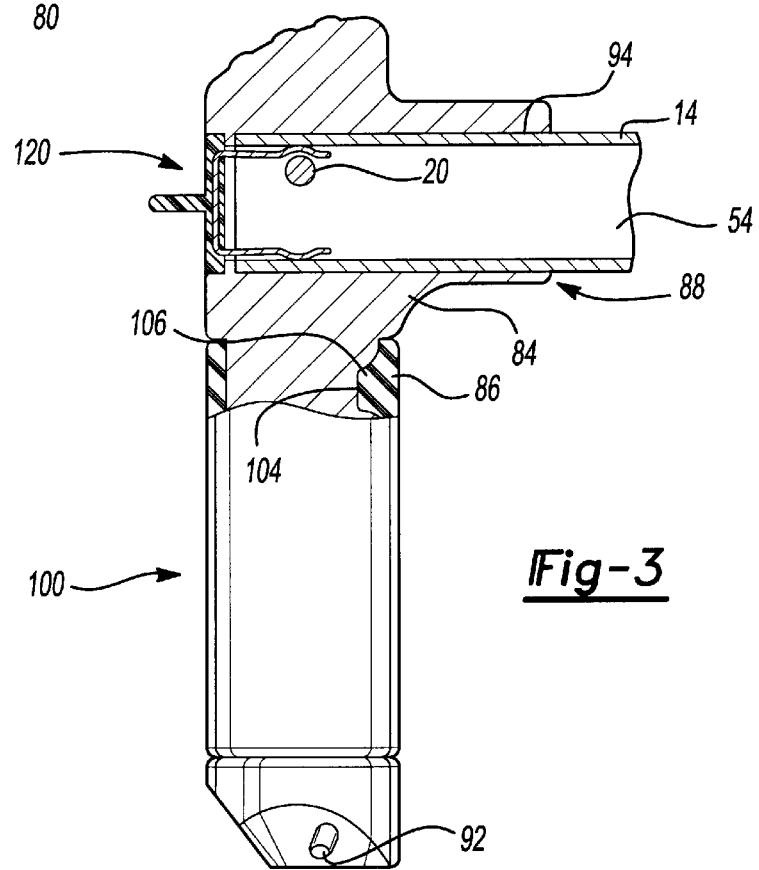
FIG. 3 is an enlarged partially broken out view of a portion of the hacksaw of FIG. 1 illustrating the construction of the front handle in greater detail.

With additional reference to FIG. 2, the rear handle 12 is illustrated to include a handle structure 24, which in the particular embodiment illustrated is generally trapazoidally shaped, having a rear leg 28, a front leg 30 and upper and lower strut members 32 and 34, respectively, which secure the rear and front legs 28 and 30 to one another in a spaced apart relation. A forwardly opening socket 36 is formed into the upper strut member 32 and is configured to receive the beam 14 therein. The handle structure 24 may be made of any appropriate material, including plastic, aluminum and magnesium, but is preferably made from steel. An optional hand guard 38, which is formed from an injection molded, impact resistant plastic is removably coupled to a front surface 40 of the front leg 30 via a pair of threaded fasteners 42.

With reference to FIGS. 1 and 6, the beam 14 defines a blade storage cavity 54 which is sized to receive one or more perishable hacksaw blades 56 that are typically used with the hacksaw 10. In the particular example provided, the beam 14 is a tube and the blade storage cavity 54 extends through the entire length of the beam 14 along its longitudinal axis 58. The tube is illustrated to have a rectangular cross-section, but those skilled in the art will understand that other types of tubes having different cross-sections (e.g., round, triangular, square, trapezoidal, hexagonal) may also be used. Also alternatively, the beam 14 may be fabricated from a non-tubular material, such as a C-channel, so long as it defines a blade storage cavity.

The beam 14 is disposed in the forwardly opening socket 36 of the rear handle 12 and extends forwardly therefrom. Fasteners, such as threaded fasteners or rivets 60, fixedly couple the beam 14 to the handle structure 24 of the rear handle 12. A fastening member aperture 62 is formed through the end of the beam 14 opposite the end that is coupled to the rear handle 12. In the example provided, the fastening member aperture 62 is sized to receive the fastening member 20 therethrough in threaded engagement.

The tensioning mechanism 16 is conventional in its construction and operation and as such, need not be described in significant detail. Briefly, the tensioning mechanism 16 is coupled to the rear handle 12 and is configured to apply tension to a hacksaw blade 56a in an adjustable manner that permits the hacksaw blade 56a that has been positioned in a working position between the rear and front handles 12 and 18 to be tensioned and untensioned. Those skilled in the art will appreciate that sufficient untensioning of the hacksaw blade 56a will permit the hacksaw blade 56a to be removed from the hacksaw 10.

With reference to FIGS. 1 and 2, the tensioning mechanism 16 of the embodiment illustrated is shown to include a link 68 that is pivotably coupled to the handle structure 24 of the rear handle 12. The link 68 includes a transverse rear projection 70, which is oriented in a direction that is transverse to the longitudinal axis of the hacksaw 10, and a skewed rear projection 72, which is oriented in a direction that is skewed to the longitudinal axis of the hacksaw 10. The tensioning mechanism 16 is also illustrated to include a latch mechanism 74 having a lever 76 and a latch 78. The lever 76 is coupled via a threaded rod 79 to the end of the link 68 that is not pivotably coupled to the rear handle 12. The effective length of the threaded rod 79 is adjustable through a thumbscrew 80, which permits the position of the transverse and skewed rear projections 70 and 72 to be rotated in a longitudinal plane of the hacksaw 10 relative to the rear handle 12. The latch 78 is selectively positionable in an engaged condition, wherein the latch 78 is engaged to the lever 76 and the adjustment of the effective length of the threaded rod 79 is inhibited, and an unengaged condition, wherein the latch 78 is disengaged from the lever 76 and the adjustment of the effective length of the threaded rod 79 is permitted.

In the example provided, each of the lever 76 and the latch 78 includes an overmolded portion 76a and 78a, respectively, that forms a portion of a primary grip 48 that is configured to be engaged by a first hand of an operator (not shown). More specifically, the overmolded portions 76a and 78a are configured to abut the palmar surface of the first hand of the operator when the hacksaw 10 is to be used in a cutting operation, while the overmolded portion 78a forms a highly grippable surface that permits the operator to readily manipulate the latch 78 to disengage it from the lever 76. The overmold members 76a and 78a are formed from a resilient material, such as thermoplastic elastomer (e.g., HYTREL® manufactured by E.I. du Pont de Nemours and Company) and are simultaneously formed and coupled to the lever 76 and the latch 78, respectively, in an injection molding operation.

With reference to FIGS. 1 and 3 through 6, the front handle 18 of the embodiment illustrated includes a front handle structure 84 and an front overmold member 86. The front handle structure 84 is shaped in the form of a cylindrical post, having a rearwardly facing socket 88 formed therethrough, as well as a transverse front projection 90, which is oriented in a direction that is transverse to the longitudinal axis of the hacksaw 10, and a skewed front projection 92, which is oriented in a direction that is skewed to the longitudinal axis of the hacksaw 10. The rearwardly facing socket 88 includes an aperture 94 that is sized to receive the beam 14 therein. In the particular embodiment illustrated, the aperture 94 in the rearwardly facing socket 88 includes a first portion 96, which is configured to receive in sliding engagement the beam 14, and a second portion 98, which is sized to inhibit forward movement of the beam 14 beyond the first portion 96 of the aperture 94. The transverse and skewed front projections 90 and 92 cooperate with the transverse and skewed rear projections 70 and 72, respectively, and serve as two alternate means on which the hacksaw blade 56a may be removably mounted. The front handle structure 84 may be made of any appropriate material, including plastic, aluminum and magnesium, but is preferably made from steel.

The front overmold member 86 is formed about the perimeter of a portion of the front handle structure 84 to thereby provide a secondary grip 100 that is configured to be engaged by the opposite hand of the operator (not shown). Like the overmold members 76a and 78a, the front overmold member 86 is formed from a resilient material, such as a thermoplastic elastomer (e.g., HYTREL® manufactured by E.I. du Pont de Nemours and Company). The front overmold member 86 is simultaneously formed and coupled to the front handle structure 84 in an injection molding operation. The front handle structure 84 may also include a plurality of attachment features 104, which cooperate with attachment legs 106 formed into the front overmold member 86 to inhibit relative rotation between the front overmold member 86 and the front handle structure 84.

The fastening member 20 is employed to fix the beam 14 to the front handle 18 and may be a pin, a rivet or a threaded fastener, for example. In the particular embodiment illustrated, the fastening member 20 is illustrated to be a threaded fastener that extends through a mounting aperture 110 in the front handle structure 84 and threadably engages the fastening member aperture 62 in the beam 14. The mounting aperture 110 and the fastening member aperture 62 are configured in a manner that positions the fastening member 20 relative to the aperture 94 in the rearwardly facing socket 88 such that the fastening member 20 does not inhibit the ingress of the hacksaw blade 56 into or the egress of the hacksaw blade 56 from the blade storage cavity 54. In this regard, the fastening member 20 need not be removed (either partially or in total) from the beam 14 to permit a hacksaw blade 56 to be inserted into or withdrawn from the blade storage cavity 54.

Figure 7:
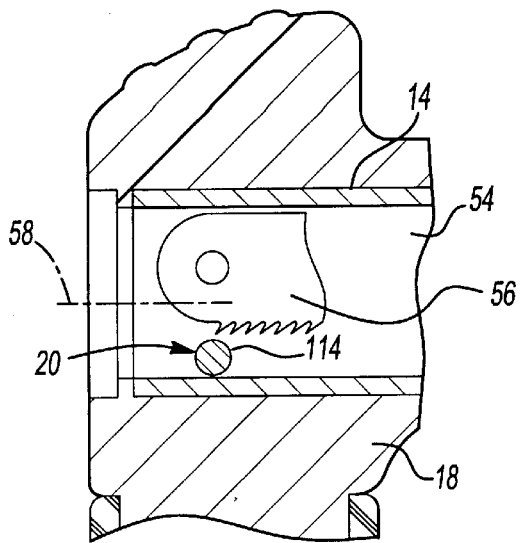
FIG. 7 is a section view similar to that of FIG. 6, but illustrating the fastening member in a different location relative to the front handle and the beam.
Figure 8:
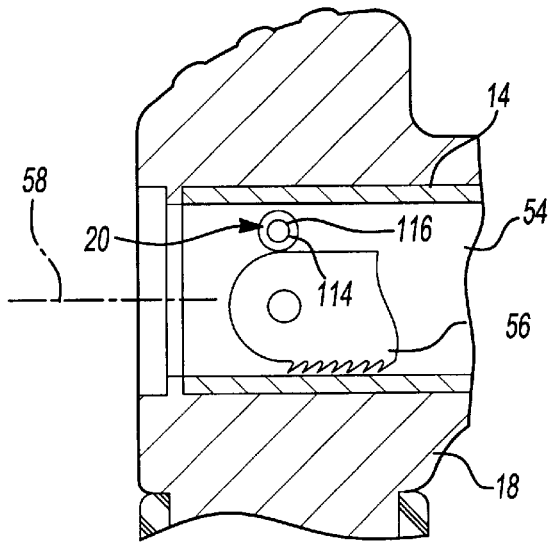
FIG. 8 is a section view similar to that of FIG. 6, but illustrating an alternately configured fastening member.
Figure 9:
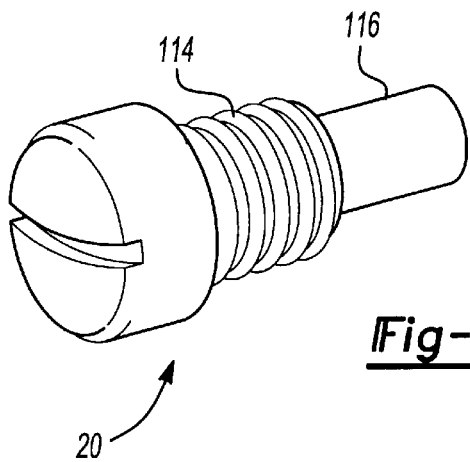
FIG. 9 is a perspective view of the fastening member illustrated in FIG. 8.
Figure 10:
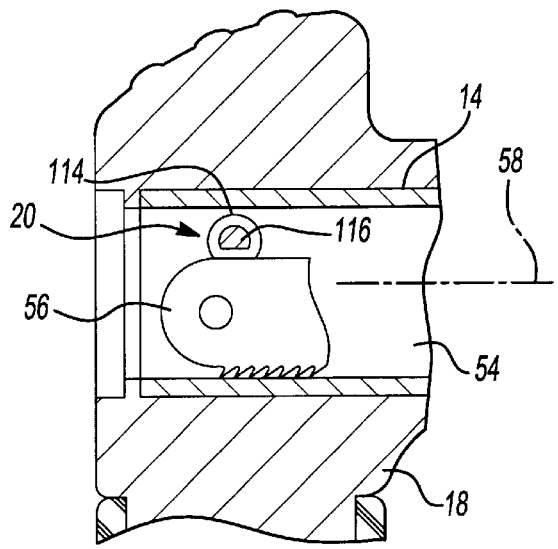
FIG. 10 is a section view similar to that of FIG. 6, but illustrating another alternately configured fastening member.

With reference to FIGS. 6 through 10, the fastening member 20 may be shifted relative to the longitudinal axis 58 of the blade storage cavity 54 to permit a hacksaw blade 56 to travel under the body 114 of the fastening member 20 (FIG. 6) or over the body 114 of the fastening member 20 (FIG. 7). Alternatively, the fastening member 20 may be configured such that its body 114 includes relieved portion 116, as shown in FIGS. 8 through 10, which permits the fastening member 20 to be placed relatively closer to the longitudinal axis 58 of the blade storage cavity 54 without inhibiting the ingress and egress of the hacksaw blade 56. In this regard, the relieved portion 116 of the body 114 may be formed about one or more planes of symmetry as shown in the examples of FIGS. 8 and 10.

Figure 11:
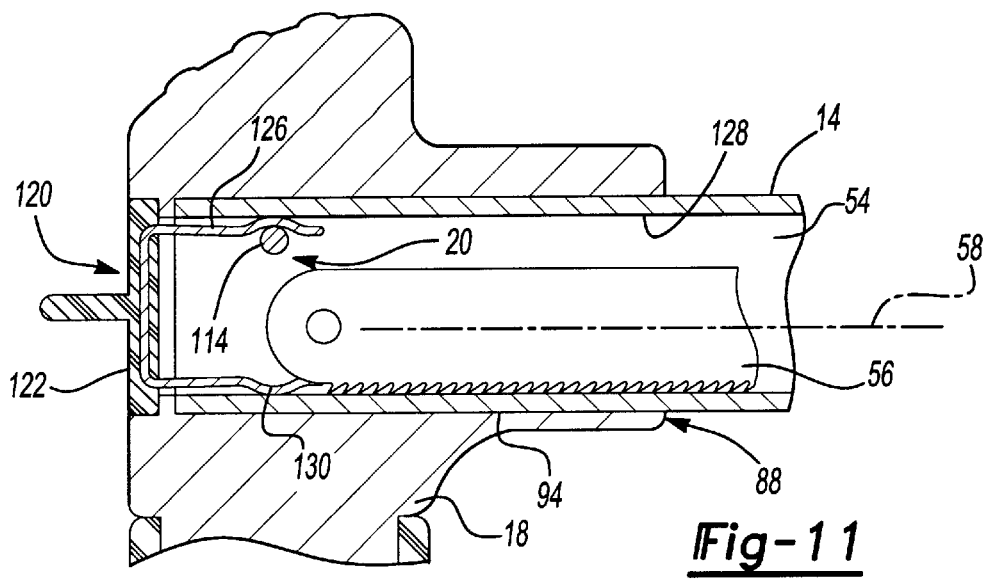
FIG. 11 is a section view similar to that of FIG. 6, but illustrating a plug as coupled to the beam to thereby inhibit the withdrawal of stored hacksaw blades from the blade storage cavity.

With reference to FIGS. 1 and 11, a plug 120 is employed to at least partially close off the open end of the blade storage cavity 54 to thereby prevent stored hacksaw blades 56 from leaving the blade storage cavity 54. In the embodiment illustrated, the plug 120 includes a plug body 122 that substantially completely closes off the aperture 94 in the rearwardly facing socket 88 to thereby inhibit the entry of dust, chips and excess moisture into the blade storage cavity 54. The plug 120 may be configured to frictionally engage the front handle 18 (e.g., the sides of the aperture 94 in the rearwardly facing socket 88) or the beam 14 (e.g., the inside surfaces 128 of the blade storage cavity 54). In the example of FIG. 11, the plug 120 includes a pair of resilient fingers 126 that extend rearwardly from the plug body 122. The resilient fingers 126 are formed from spring steel and engage opposite inside surfaces 128 of the blade storage cavity 54. Coupling protrusions 130 may be attached, embossed, stamped or otherwise formed onto the inside surfaces 128 to increase the ability with which the resilient fingers 126 frictionally engage the beam 14.

Figure 12:
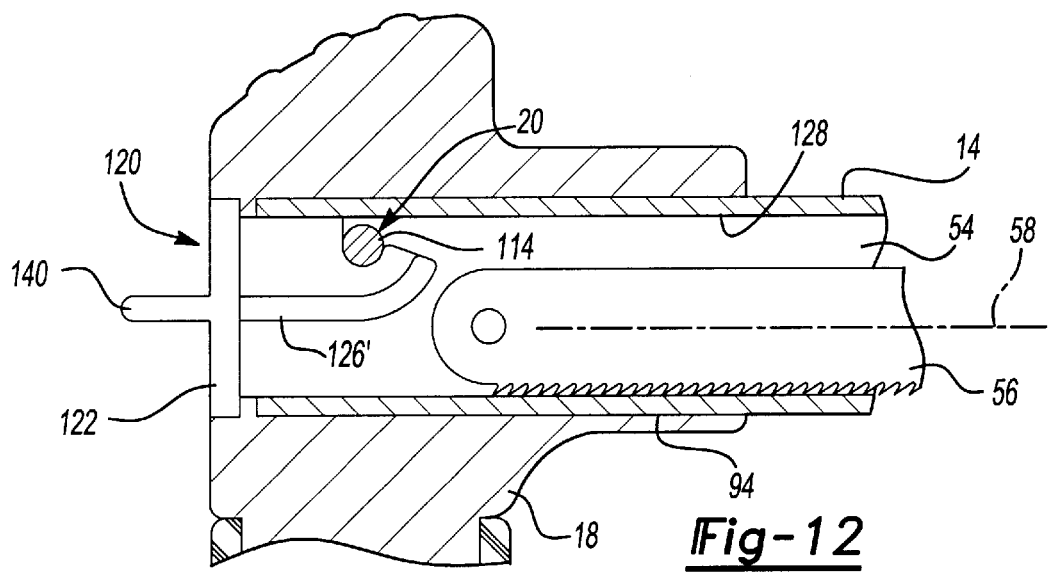
FIG. 12 is a section view similar to that of FIG. 11, but illustrating a plug of an alternate configuration.
Figure 13:
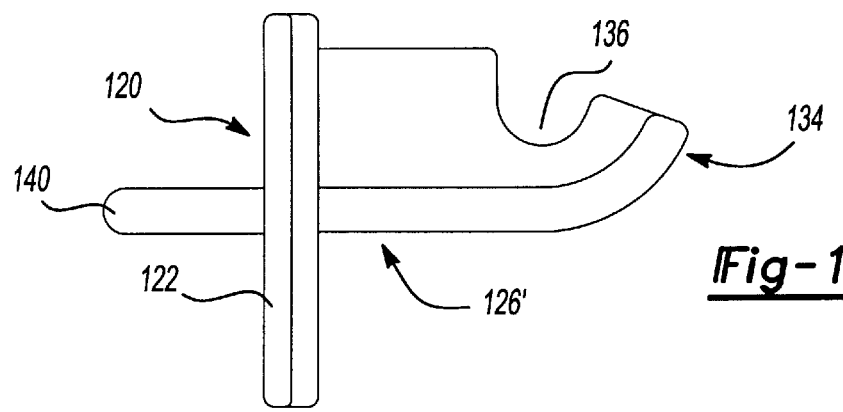
FIG. 13 is a side view of the plug illustrated in FIG. 12.

Additionally or alternatively, the plug 120 may be configured to releasably engage the fastening member 20 that couples the beam 14 and the front handle 18. In the embodiment of FIGS. 12 and 13, the plug 120 is formed from a plastic material and includes a resilient finger 126' that is configured to engage a side of the body 114 of the fastening member 20. The resilient finger 126' has a leading edge 134 and a recess 136. The recess 136 is configured to approximately conform to a portion of the body 114 of the fastening member 20 to thereby permit the resilient finger 126' to lock onto the fastening member 20. The leading edge 134 is preferably contoured on its opposite sides, such as by a chamfer or a radius, to guide the resilient finger 126' into engagement with the fastening member 20.

The plug 120 is preferably equipped with a gripping structure 140 that is configured to be grasped by the fingers of an individual. Incorporation of the gripping structure 140 into the plug 120 permits the resilient fingers 126' to securely engage the front handle 18, the beam 14 and/or the fastening member 20 while providing a tool-less means by which an individual may withdraw the plug 120. In the example provided, the gripping structure 140 is a tab that is generally planar in shape and which extends forwardly from the plug body 122. Those skilled in the art will understand, however, that the gripping structure 140 may be formed differently, such as in the shape of a round or contoured knob. Alternatively, recesses may be formed into the plug body 122 adjacent a forward face of the front handle 18. The recesses may be configured to accept a coin, such as a quarter, nickel or dime, or the end of a hacksaw blade 56, and would permit an individual to employ the coin or the hacksaw blade as a lever for withdrawing the plug 120 with a prying motion.

Although the body 114 of the plug 120 is illustrated as completely closing off either the blade storage cavity 54 or the aperture 94 in the rearwardly facing socket 88, those skilled in the art will understand that the body 114 of the plug 120 need only be sized to block a sufficient portion of either the blade storage cavity 54 or the aperture 94 in the rearwardly facing socket 88 to inhibit the hacksaw blades 56 that are contained in the blade storage cavity 54 from fully withdrawing from the blade storage cavity 54.

While the hacksaw 10 has been described thus far as including a discrete front handle 18 that is coupled to a discrete beam 14 by means of a fastening member 20, those skilled in the art will appreciate that the invention, in its broader aspects, may be constructed somewhat differently. The front handle 18 and the beam 14 may be coupled via welds or may be unitarily formed such that a fastening member 20 is not required. In such situations, the plug 120 may be configured to simply engage the sides of the blade storage cavity 54 as described above.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A hacksaw comprising:
   a handle;
   a beam defining a blade storage cavity that is configured to receive a perishable hacksaw blade, the beam being coupled at an end to the handle at a connection; and
   a plug that is selectively coupled to at least one of the handle and the beam to inhibit the hacksaw blade from fully withdrawing from the blade storage cavity, the plug including at least one resilient finger that is configured to engage at least one of the handle and the beam;
   wherein ingress of the hacksaw blade to and egress of the hacksaw blade from the blade storage cavity are obtained without altering the connection between handle and the beam through the removal of the plug; and
   wherein removal of the plug is solely accomplished by pulling the plug from the at least one of the handle and the beam to which the plug is engaged.

2. A hacksaw comprising:
   a handle having an aperture formed therethrough;
   a beam defining a blade storage cavity that is configured to receive a perishable hacksaw blade, the beam being aligned to the handle such that the blade storage cavity is aligned to the aperture in the handle such that the hacksaw blade may be slidingly introduced into the blade storage cavity though the aperture; and
   a fastening member fixing the handle and the beam to one another, the fastening member having a body that extends through the blade storage cavity, the body being positioned relative to the blade storage cavity in a manner that permits the hacksaw blade to move freely into and out of the blade storage cavity while the fastening member is secured to both the handle and the beam.

3. The hacksaw of claim 2, further comprising a second handle and a tensioning mechanism, the second handle coupled to an end of the beam opposite an end at which the handle is coupled, the tensioning mechanism coupled to the second handle and selectively moving a rearward mounting point on which the hacksaw blade is mounted to thereby adjust a level of tension applied to the hacksaw blade.

4. A hacksaw comprising:

beam defining a blade storage cavity that is configured to receive a perishable hacksaw blade;

a fastening member fixing the handle and the beam to one another, the fastening member having a body that extends through the blade storage cavity, the body being positioned relative to the blade storage cavity in the manner that permits the hacksaw blade to move freely into and out of the blade storage cavity while fastening member is secured to both the handle and the beam; and a plug for frictionally engaging at least one of the handle, the beam and the fastening member to thereby inhibit the hacksaw blade from fully exiting the blade storage cavity, the plug being removable from the at least one of the handle, the beam and the fastening member to thereby permit the hacksaw blade to be fully withdrawn from the blade storage cavity without affecting the coupling of the handle and the beam.

5. The hacksaw of claim 4, wherein the plug is formed from a resilient plastic material.

6. The hacksaw of claim 5, wherein the plug includes a plurality of fingers that are configured to frictionally engage the fastening member, each of the fingers having a recess that is sized to conform to a portion of the body when the plug is coupled to the at least one of the handle, the beam and the fastening member.

7. A hacksaw comprising:

a first handle;

a beam defining a blade storage cavity that is configured to receive a perishable hacksaw blade, the beam being coupled at a first end to the first handle;

a second handle coupled to a second end of the beam, the second handle having an aperture that extends through the second handle and which intersects the blade storage cavity;

a fastening member fixing the second handle and the beam to one another, the fastening member having a body that extends through the aperture, the body being positioned relative to the aperture in a manner that permits the hacksaw blade to move into and out of the blade storage cavity while the fastening member is secured to the second handle and the beam without the hacksaw blade contacting the body;

a plug formed from a resilient plastic material and operable for selectively closing off the aperture to inhibit the hacksaw blade from exiting the blade storage cavity through the aperture, the plug including a plurality of fingers that are configured frictionally engage the fastening member, each of the fingers having a recess that is size to conform to a portion of the body when the plug has closed off the aperture; and a tensioning mechanism coupled to the first handle and selective moving a rearward mounting point on which the hacksaw blade is mounted to thereby adjust a level of tension applied to the hacksaw blade.

8. The hacksaw of claim 7, wherein the first handle has a first handle structure and a first overmold portion, the first overmold portion being coupled to the first handle structure and forming a first grip.

9. The hacksaw of claim 8, wherein the second handle has a second handle structure and a second overmold portion, the second overmold portion being coupled to the second handle structure and forming a second grip.

10. A hacksaw comprising:

a handle;

a beam defining a blade storage cavity that is configured to receive a perishable hacksaw blade, the beam being coupled to the handle;

a fastening member having a body, the fastening member fixing the handle and the beam to one another such that the body is positioned relative to the beam in a manner that permits the hacksaw blade to move freely into and out of the blade storage cavity while the fastening member secures the handle to the beam; and a plug for selectively closing off at least a portion of the blade storage cavity to inhibit the hacksaw blade from exiting the blade storage cavity, the plug including at least one resilient finger that is configured to engage the body of the fastening member when the plug closes off the blade storage cavity.

11. The hacksaw of claim 10, wherein the fastening member is selected from a group consisting of: threaded fasteners and rivets.

12. The hacksaw of claim 10, wherein the handle is a front handle of the hacksaw.

13. The hacksaw of claim 10, wherein the plug also frictionally engages at least one of the handle and the beam.

14. The hacksaw of claim 1, wherein the resilient finger includes a recess that is sized to conform to a portion of the body when the plug has closed off the blade storage cavity.

15. The hacksaw of claim 2, wherein a leading edge of the resilient finger is contoured to guide the resilient finger over the portion of the body.

16. The hacksaw of claim 10, wherein the plug includes a gripping structure that is configured to be grasped by an individual when the individual desires to remove the plug from the handle.

17. The hacksaw of claim 16, wherein the gripping structure is generally planar in shape.

18. The hacksaw of claim 10, wherein the beam is formed from a tubular material.

19. The hacksaw of claim 18, wherein the tubular material has a rectangular cross section.

* * * * *

UNITED STATES PATENT AND TRADEMARK OFFICE
CERTIFICATE OF CORRECTION

PATENT NO. : 6,820,341 B2  
DATED : November 23, 2004  
INVENTOR(S) : Gregory Scott Snider It is certified that error appears in the above-identified patent and that said Letters Patent is hereby corrected as shown below:

Column 7,  
Between line 6 and line 7, insert as a separate paragraph -- a handle --.  
Line 7, before "beam" insert -- a --.  
Line 13, "the manner" should be -- a manner --.  
Line 14, after "while" insert -- the --.  
Line 55, after "configured" insert -- to --.

Column 8,  
Line 1, "size" should be -- sized --.  
Line 5, "selective" should be -- selectively --.

Signed and Sealed this

Sixth Day of June, 2006

JON W. DUDAS  
*Director of the United States Patent and Trademark Office*